United States Patent
Norman

(10) Patent No.: US 9,253,665 B2
(45) Date of Patent: Feb. 2, 2016

(54) METHOD AND APPARATUSES FOR INITIALISING A RADIO BASE STATION

(75) Inventor: Mårten Norman, Spånga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1 day.

(21) Appl. No.: 14/349,060

(22) PCT Filed: Oct. 4, 2011

(86) PCT No.: PCT/SE2011/051183
§ 371 (c)(1),
(2), (4) Date: Apr. 1, 2014

(87) PCT Pub. No.: WO2013/051970
PCT Pub. Date: Apr. 11, 2013

(65) Prior Publication Data
US 2014/0248925 A1   Sep. 4, 2014

(51) Int. Cl.
*H04W 24/00* (2009.01)
*H04W 24/02* (2009.01)
*H04W 64/00* (2009.01)
*H04W 88/08* (2009.01)

(52) U.S. Cl.
CPC ........... *H04W 24/02* (2013.01); *H04W 64/003* (2013.01); *H04W 88/08* (2013.01)

(58) Field of Classification Search
USPC ........... 455/456.1, 435.2, 440, 444, 449, 524, 455/525, 422.1, 404.2, 450, 509; 370/328, 370/329, 338
See application file for complete search history.

(56) References Cited

U.S. PATENT DOCUMENTS

| 7,995,482 | B2 * | 8/2011 | Polakos | 370/241 |
| 2005/0255889 | A1 * | 11/2005 | Haseba et al. | 455/561 |
| 2006/0268719 | A1 * | 11/2006 | Takase et al. | 370/235.1 |
| 2007/0097939 | A1 * | 5/2007 | Nylander et al. | 370/338 |
| 2007/0139199 | A1 * | 6/2007 | Hanlon | 340/572.1 |

(Continued)

FOREIGN PATENT DOCUMENTS

| EP | 1 947 811 A1 | 7/2008 |
| WO | WO 2008/093103 A2 | 8/2008 |
| WO | WO 2011/047735 A1 | 4/2011 |

OTHER PUBLICATIONS

International Search Report, Application No. PCT/SE2011/051183, Jul. 16, 2012.

(Continued)

*Primary Examiner* — Dominic E Rego
(74) *Attorney, Agent, or Firm* — Patent Portfolio Builders, PLLC

(57) ABSTRACT

It is presented a method for initializing a radio base station. The method comprises the steps, performed in the radio base station, of: obtaining location data for the radio base station; receiving a configuration message over a first communication link, the configuration message matching the location data for the radio base station and the configuration message comprising at least one connectivity parameter; and establishing, based on the at least one connectivity parameter, a connection with a core network over a second communication link, the second communication link being different from the first communication link. This means that the first communication link can be used to obtain connectivity using the configuration message intended for the radio base station with the matching location. A corresponding radio base station, computer program and computer program product are also presented.

17 Claims, 4 Drawing Sheets

(56) References Cited

U.S. PATENT DOCUMENTS

| | | |
|---|---|---|
| 2008/0039132 A1* | 2/2008 | Delibie et al. ............. 455/552.1 |
| 2009/0092096 A1 | 4/2009 | Czaja et al. |
| 2009/0129291 A1* | 5/2009 | Gupta et al. ................. 370/254 |
| 2011/0021199 A1* | 1/2011 | Hapsari et al. ................ 455/440 |
| 2011/0125850 A1* | 5/2011 | Rahnama et al. ............. 709/205 |
| 2011/0136488 A1* | 6/2011 | Kuvvali et al. ............... 455/436 |
| 2011/0201360 A1* | 8/2011 | Garrett et al. ................. 455/457 |
| 2011/0201369 A1* | 8/2011 | Kim et al. ..................... 455/507 |
| 2011/0319112 A1* | 12/2011 | Jeong et al. ................... 455/509 |
| 2012/0231826 A1* | 9/2012 | Koorapaty et al. ........... 455/509 |
| 2012/0258715 A1* | 10/2012 | Souissi et al. ................. 455/436 |

OTHER PUBLICATIONS

Written Opinion of the International Searching Authority, Application No. PCT/SE2011/051183, Jul. 16, 2012.

Frenger et al., "Smart Simplicity in radio network management", Ericsson Review No. 2, 2008, pp. 73-76.

* cited by examiner

METHOD AND APPARATUSES FOR INITIALISING A RADIO BASE STATION

CROSS REFERENCE TO RELATED APPLICATION

This application is a 35 U.S.C. §371 national stage application of PCT International Application No. PCT/SE2011/051183, filed on 4 Oct. 2011, the disclosure and content of which is incorporated by reference herein in its entirety. The above-referenced PCT International Application was published in the English language as International Publication No. WO 2013/051970 A1 on 11 Apr. 2013.

TECHNICAL FIELD

Embodiments presented herein relate to a method for initialising a radio base station and a corresponding radio base station, computer program and computer program product.

BACKGROUND

Deploying new radio base stations can be complicated. However, the actual deployment in the field benefits from being as simple as possible, as the physical environment can be demanding and the detailed technical skill of the service technician performing the physical deployment can vary at best and can be very low at worst. There is also a desire to keep cost down and/or increase availability of manpower by using staff with as low skill and/or short training as possible.

Ericsson Review #2 2008 page 74 discloses a situation where a new site for a radio base station is introduced. It is shown how a large part of the configuration can be performed automatically. However, the actual installation requires an on-site installer entering initial data (for example, radio base station identity) and activating the self-configuring function. In other words, there are still some parameters that need to be manually configured on site to initialise the configuration process. Any such manual entry, no matter the extent of it, is a risk factor for human errors and requires input devices, should thus be avoided if possible.

SUMMARY

It is thus an object to simplify the deployment of a new radio base station.

According to a first aspect, it is presented a method for initialising a radio base station. The method comprises the steps, performed in the radio base station, of: obtaining location data for the radio base station; receiving a configuration message over a first communication link, the configuration message matching the location data for the radio base station and the configuration message comprising at least one connectivity parameter; and establishing, based on the at least one connectivity parameter, a connection with a core network over a second communication link, the second communication link being different from the first communication link. This means that the first communication link can be used to obtain connectivity using the configuration message intended for the radio base station with the matching location. In this way, the configuration parameters for the radio base station can be preconfigured centrally, and applied to the correct radio base station using the location to distinguish the radio base station. This is natural since the network planning presupposes a particular location (stationary or mobile) to achieve desired network coverage and capacity. By using the first communication link initially, the initial connection is decoupled from the second connection, being the connection with the core network, allowing full freedom during the network planning. This method thus relieves an installing service technician from even manually entering initial connectivity parameters during deployment.

The step of receiving the configuration message may comprise receiving the configuration message from a configuration server, and the method may further comprise the step, prior to the step of receiving a configuration message, of: sending, over the first communication link, a configuration request to the configuration server, the configuration request comprising the location data for the radio base station. If the first link is a bidirectional link, the step of first sending the configuration request makes the process efficient.

The first communication link may be a bidirectional link comprising use of a mobile communication data link via another radio base station. The first communication link may be a bidirectional link comprising use of a satellite telephony link.

The method may further comprise the step, prior to the step of sending a configuration request, of: initialising communication over the first link using a subscription entity enabling international roaming access. For example, the subscription entity can be a subscriber identity module (SIM) with international roaming. In this way, the first link can enable access to a globally common server, regardless of the location of the radio base station deployment.

The method may further comprise the step, after the step of establishing a connection with the core network, of: receiving a further configuration message comprising all additional configuration data required to enable normal operation of the radio base station. In other words, all configuration data to enable normal operation of the radio base station is provided without any manual configuration by the service technician performing the physical deployment. The further configuration message can be received from an operation and management server.

The at least one connectivity parameter may comprise an identifier of the radio base station, and the method may comprise the step, after the step of establishing a connection with the core network and prior to the step of receiving a further configuration message, of: sending a further configuration request comprising the identifier of the radio base station, to a operation and management server 31 to allow the operation and management server 31 to obtain the all additional configuration data required to enable normal operation of the radio base station. The identity of the radio base station thus forms the link between the initial configuration message (which matches the location of the radio base station) and the further configuration message.

The further configuration message may comprise one or more of the following parameters: frequencies and transmission power levels.

The method may further comprise the step of: activating any cells under the control of the radio base station. This makes the radio base station fully operational.

The at least one connectivity parameter may comprise a network address for the radio base station for the second communication link. The at least one connectivity parameter may comprise an identifier of a core network interface of the radio base station to use for the second communication link. The at least one connectivity parameter may comprise a network address for an operation and management server to communicate with over the second communication link.

The step of receiving a configuration message may comprise receiving the configuration message, comprising intended location data, over the first communication link being a broadcast medium, and verifying that the radio base station is an intended recipient by matching the intended location data and the location data of the radio base station. In other words, the configuration message can be received over a unidirectional communication medium such as the broadcast medium. If multiple radio base stations are to be deployed, a number of configuration messages can be transmitted over the broadcast medium. But since the intended recipient is verified, only a configuration messages intended for the radio base station in question will be used.

A second aspect is a radio base station comprising: a location obtainer arranged to obtain location data for the radio base station; a first link interface arranged to receive a configuration message over a first communication link, the configuration message matching the location data for the radio base station, and the configuration message comprising at least one connectivity parameter; a core network interface; and a controller arranged to establish, based on the at least one connectivity parameter, a connection with a core network over a second communication link through the core network interface, the second communication link being different from the first communication link.

The location obtainer may comprise a receiver for a use with any one or more of Global Positioning System, GPS; Global Orbiting Navigation Satellite System, GLONASS; Galileo; Compass/Beidou; and Indian Regional Navigational Satellite System, IRNSS.

The location obtainer is arranged to obtain location data of remote radio units under control of the radio base station. In other words, as the radio units may be located away from the radio base station, it may sometimes be more appropriate to use the location of the remote radio units.

The location obtainer may be arranged to obtain location data based on a detected radio environment of radio units connected to the radio base station. This environment may be a signal from another RBS, a satellite or other signal source. Optionally, these can be signals that may be used at least partly for determining a position.

The core network interface may be an interface for an optical connection. The core network interface may be an interface for a galvanic connection. The core network interface may be an interface for a microwave link.

A third aspect is a radio base station comprising: means for obtaining location data for the radio base station; means for receiving a configuration message over a first communication link, the configuration message matching the location data for the radio base station and the configuration message comprising at least one connectivity parameter; and means for establishing, based on the at least one connectivity parameter, a connection with a core network over a second communication link, the second communication link being different from the first communication link.

A fourth aspect is a computer program for initialising a radio base station. The computer program comprises computer program code which, when run on a processor of a radio base station, causes the radio base station to: obtain location data for the radio base station; receive a configuration message over a first communication link, the configuration message matching the location data for the radio base station and the configuration message comprising at least one connectivity parameter; and establish, based on the at least one connectivity parameter, a connection with a core network over a second communication link, the second communication link being different from the first communication link.

A fifth aspect is a computer program product comprising a computer program according to the fourth aspect and a computer readable means on which the computer program is stored.

It is to be noted that any feature of the first, second, third, fourth and fifth aspect may, where appropriate, be applied to any one or more other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art Like numbers refer to like elements throughout the description.

Figure 1A:
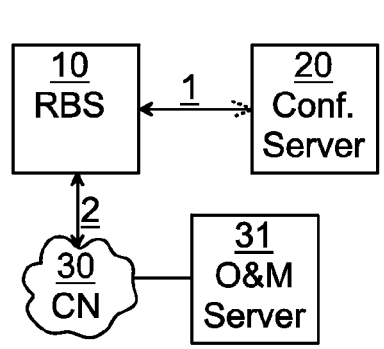
FIGS. 1A-B are schematic diagrams illustrating environments where embodiments presented herein can be applied.

FIG. 1A is a schematic diagram illustrating an environment where embodiments described herein can be applied. The illustrated components are all part of a mobile communication network, e.g. complying with any one or a combination of UMTS (Universal Mobile Telecommunications System), CDMA2000 (Code Division Multiple Access 2000), LTE (Long Term Evolution), GSM (Global System for Mobile Communications), etc.

A radio base station 10 is responsible for one or more radio cells (not shown) for wireless communication with one or more mobile communication terminals (not shown). The term mobile communication terminal is also known as mobile terminal, user equipment, user terminal, user agent, etc.

During deployment of the radio base station 10, it needs to be configured before it can operate normally, i.e. to serve traffic to and from mobile communication terminals. This configuration can e.g. include hundreds of parameters. Furthermore, a software update can occur to ensure the radio base station 10 is up to date with the software and/or hardware state of the rest of the network.

The radio base station 10 is connected via a first communication link 1 to a configuration server 20. The configuration server 20 can in this way send a configuration message comprising one or more connectivity parameters to the radio base station 10. These connectivity parameters can include e.g. which port (e.g. Ethernet port) to use for the core network interface, the location (address) of the operation and maintenance server 31 and/or identity of the radio base station 10. In this way, the radio base station 10 can subsequently, based on the connectivity parameters, establish a more permanent connection with a core network 30 and, when applicable, the rest of the mobile communication network over a second communication link 2. More permanent is here to be interpreted as a connection which can be used during normal operation of the radio base station, when the installation phase is over and the radio base station is capable of serving traffic to and from mobile communication terminals. After the second communication link 2 is established, and since an operation and maintenance server 31 is connected to the core network 30, communication between the radio base station 10 and the operation and maintenance server is also enabled. The configuration server 20 and the operation and maintenance server 31 each have access to memory comprising respective configuration parameters and optionally software which is to be distributed to the radio base station 10.

The first communication link 1 and the second communication link 2 are separate links and do not use the same medium.

The first communication link 1 can utilise point-to-point communication, such as a mobile communication link via another radio base station (using the same or a different mobile communication network in relation to the intended mobile communication network for the radio base station 10 when operational) or a satellite telephone link. Alternatively or additionally, the first communication link involves the use of a data channel in broadcast signals such as television signals or radio signals, e.g. of the type Frequency Modulation (FM), Amplitude Modulation (AM), Digital Audio Broadcasting (DAB), Digital Video Broadcasting (DVB) longwave, shortwave or microwave, including satellite. The use of point-to-point or broadcast communication for this purpose will be explained in more detail below. When using point-to-point communication, the first communication link 1 can be bidirectional in contrast to when broadcast signals are used and the first communication link 1 unidirectional from the configuration server 20 to the radio base station 10. This is indicated in FIG. 1A by the dotted arrowhead on one end of the first communication link 1.

While not shown here for reasons of clarity, there may be a plurality of radio base stations 10 connected to each instance of configuration server 20 and operation and management server 31. Other components that are part of the mobile communication network but are not important for the described embodiments are omitted here for reasons of clarity.

Figure 1B:
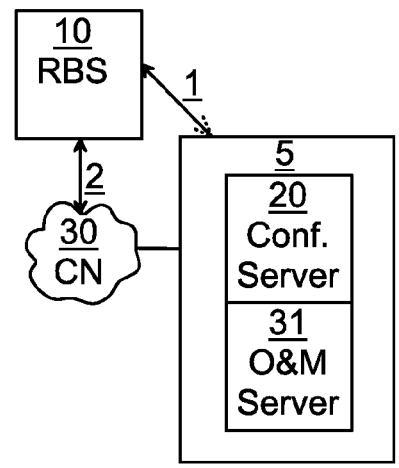

In FIG. 1B the configuration server 20 and the operation and maintenance server 31 are combined in a combined server 5. The combined server 5 can thus send a configuration message to the radio base station 10 over the first communication link 1 from the configuration server 20. Furthermore, the combined server 5 can communicate with the core network 30.

The combined server 5 can house the configuration server 20 and the operation and management server 31 as separate software modules within the same execution environment or as separate hardware entities under the control of the combined server. For reasons of reliability and/or scalability, either one of the configuration server 20, the operation and management server 31 and/or the combined server 5 can be implemented using a plurality of individual servers in the same location or spread across different locations.

Figure 2:
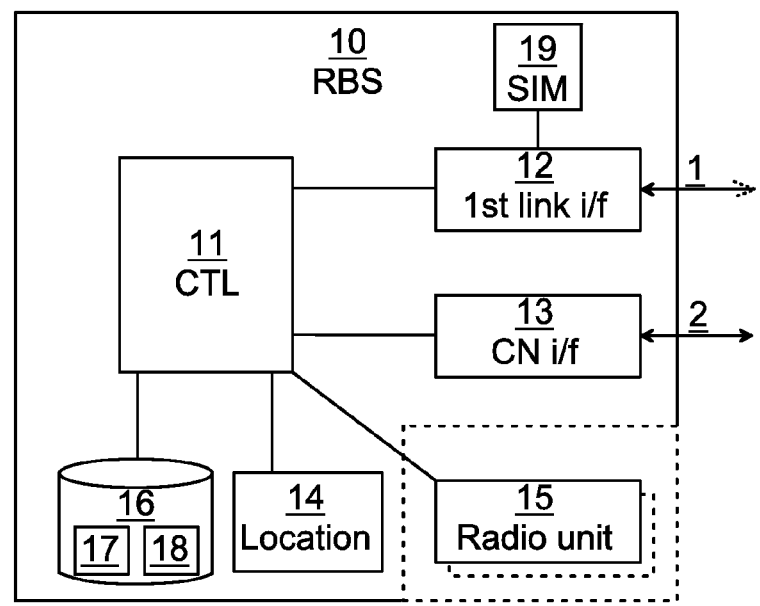
FIG. 2 is a schematic diagram illustrating some modules of an embodiment of the radio base station of FIGS. 1A-B.

FIG. 2 is a schematic diagram illustrating some modules of an embodiment of the radio base station 10 of FIGS. 1A-B.

A controller 11 is provided using any suitable central processing unit (CPU), microcontroller, digital signal processor (DSP), etc., capable of executing software instructions stored in a computer program product 16 in the form of a memory. The processor 11 is also known as a processor. The computer program product 16 can be a memory or any combination of read and write memory (RAM) and read only memory (ROM). The memory also comprises persistent storage, which, for example, can be any single one or combination of magnetic memory, optical memory, or solid state memory or even remotely mounted memory. The computer program product 16 can also store any connectivity parameters 17 of a received configuration message and additional configuration data 18 of a further configuration message.

A first link interface 12 can receive and optionally send data over the first communication link 1 and is adapted in accordance with the medium and protocol used for the first communication link 1. When the first communication link uses a mobile communication network or satellite telephony link, an optional Subscriber Identity Module (SIM) 19, also known as Universal Subscriber Identity Module (USIM), is connected to the first link interface 12. The SIM 19 can be in the form of an integrated circuit or smart card, or a so called soft SIM, which is implemented in existing memory available to the first link interface 12. Hence, when the first communication link 1 uses a mobile communication network or satellite telephony link, the first link interface 12 comprises the appropriate software and/or hardware to receive the configuration message over the first communication link being a point-to-point communication link.

The point-to-point communication link can e.g. use SMS (Short Messaging Service) for this communication, since has relatively low requirements on signal quality. Optionally, an IP (Internet Protocol) connection over the point-to-point connection link can be used. Moreover, coverage from a cell of a neighbouring radio base station used for a point-to-point communication link can be extended (compared to when using a normal hand-held mobile communication terminal) by using antennas which are larger and can be deliberately directed towards a neighbouring radio base station, or by the simple fact that there may be fewer obstacles in the way to a neighbouring radio base station from an antenna which is placed high up. Optionally, one or more of the regular antennas of the one or more radio units 15 of the radio base station 10 can be used in the initial stage to achieve connectivity via one of the neighbouring radio base stations.

When the first communication link 1 uses a broadcast medium, the first link interface 12 comprises appropriate hardware and/or software to receive the configuration message over the first communication link 1, such as an antenna, analogue circuitry, decoder, etc.

Using the parameters of the configuration message received over the first communication link 1, a core network interface 13 can be set up to establish a connection over the second communication link 2. The core network interface 13 comprises appropriate components to communicate over the second communication link 2, whatever form the second communication link 2 may be, such as an optical connection, a galvanic connection or a microwave link.

One or more radio units 15 are connected to the controller 11. Each one of the radio units 15 comprise one or more antennas and appropriate analogue and/or digital circuitry, such that each radio unit 15 can be responsible for one cell. The one or more radio units 15 can be part of or adjacent to the radio base station 10 or located remotely, e.g. at a distance up to several kilometers from the radio base station 10.

A location obtainer 14 is connected to the controller 11 and can provide location data for the radio base station 10. The location data can reflect the location of the radio base station 10 itself and/or the radio units 15. This will be described in more detail below with reference to FIGS. 4A-C.

The location obtainer 14 can obtain a location using a satellite based location determination system, such as Global Positioning System (GPS) Global Orbiting Navigation Satellite System (GLONASS), Galileo, Compass/Beidou; and/or Indian Regional Navigational Satellite System (IRNSS). Alternatively, or additionally, location can be determined using indirect information, such as "inside radio base station cell abcd3333", "inside WLAN with MAC address 33dd7799aaee", "carried by car with identifier QWER 123" or any label or labels that the radio unit(s) 15 can detect in its environment, and that the configuration server 20 can use to determine a location for where an radio base station (and hence the radio base station cell(s)) should be located. The environment can include radio signals, such as a signal from another RBS, a satellite or other signal source that may also be used at least partly for determining a position. Optionally, visual and/or audio input can be used to determine location, e.g. using matrix barcodes, or the recognition of well-known buildings or sounds, such as from church bells, in the surrounding area.

The location data is used to ensure that the configuration message received over the first communication link 1 is intended for the radio base station 10. In this way, the radio base station receives the correct configuration for its cells, etc., which typically varies between radio base stations.

The radio base station 10 is thus configured such that the controller 11 uses the at least one connectivity parameters 17 received in the configuration message from the first link interface 12, to establish the connection with the core network 30 over the second communication link 2.

Figure 3A:
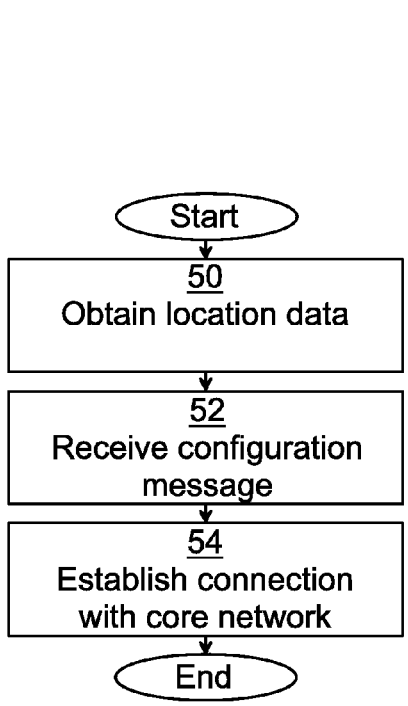
FIG. 3A is a flow chart illustrating a method according to one embodiment executed in the radio base station of FIGS. 1A-B and 2.

FIG. 3A is a flow chart illustrating a method according to one embodiment executed in the radio base station of FIGS. 1A-B and 2. The purpose of the method is to initialise a radio base station 10 that has not yet been configured. This method can be part of a preconfigured boot sequence and can thus start without user involvement once the radio base station is powered on and connected.

In an initial obtain location data step 50, location data for the radio base station 10 is obtained using a location obtainer 14 of the radio base station as described with reference to FIG. 2 above.

In a receive configuration message step 52, a configuration message is received over the first communication link from the configuration server. The configuration message matches the location data. This match can occur by the configuration message being sent by the configuration server as a response to location data received from the radio base station. Alternatively, the configuration message can comprise intended location data and the radio base station can match the location data from the location obtainer with the intended location data. The reason for this matching is that cell planning has been performed prior to this method. In the cell planning, the configuration to be applied to the radio base station has been determined, including the location of the radio base station. Since the location is a good indicator of the identity of the radio base station to deployed, this matching ensures that it is the configuration intended for this particular radio base station which is applied.

Regardless whether the matching is performed by the configuration server or the radio base station, the matching does not need to be exact. The matching can e.g. be within a range of a certain number of meters. The accuracy of the location matching only needs to be sufficient to distinguish this particular radio base station from any other radio base stations that are waiting to be deployed.

The configuration server identifies the radio base station based on the location for the radio base station and the configuration message can comprise an identifier of the radio base station. This identifier can be a temporary identifier or the identifier that is used more permanently within the mobile communication network, but in any case the identifier allows the operation and maintenance server to determine the identity of the radio base station. The mapping from location to identity of the radio base station can be based on a cell plan of the mobile communication network. In this way, once new cells are planned, the location of these can be used during this initiation sequence to identify the radio base station that, when eventually installed, is responsible for the new cells when the new radio base station is powered on.

In an establish connection with core network step 54, the connection with the core network is established over the second communication link. After this, communication can occur between the radio base station and the operation and maintenance server, whereby any further steps can occur that are needed to make the radio base station fully operational.

Through this method, a service technician can install a radio base station by simply connecting all interfaces and powering the radio base station on. In this way, unconfigured base stations can be set up to a usable state without any local manual configuration.

Figure 3B:
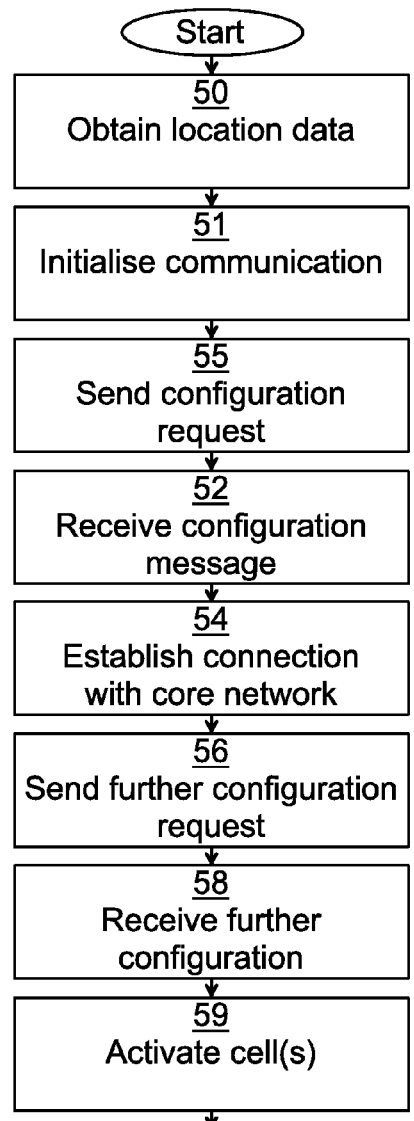
FIG. 3B is a flow chart illustrating a method according to another embodiment executed in the radio base station FIGS. 1A-B and 2.

FIG. 3B is a flow chart illustrating a method according to another embodiment executed in the radio base station of FIGS. 1A-B and 2. The purpose of the method, as for the method shown in FIG. 3A, is to initialise a radio base station 10 that has not yet been configured. This method can be part of a preconfigured boot sequence and can thus start without user involvement once the radio base station is powered on and connected.

The steps shown in FIG. 3A have corresponding steps in this method an will not be explained again.

After the obtain location data step 50, an optional initialise communication step 51 is performed. This step includes any step to set up the first link interface (12 in FIG. 2). For example, in the case of the first communication link being a point-to-point interface, this step can include registering with the communication network using e.g. the SIM (19 in FIG. 2). In another example, in the case of the first communication link being a broadcast receiver, this step can include tuning to a preconfigured frequency and/or channel to be able to receive the configuration message In the optional send configuration request step 55, the radio base station sends a configuration request to the configuration server. The configuration request includes location data for the radio base station sourced from the location obtainer. This step requires two-way communication between the radio base station and the configuration server and is not applicable when the first communication link only includes a broadcast link. The method then proceeds to the receive configuration message step 52.

After the establish connection with core network step 54, the method optionally proceeds to an optional send further configuration request step 56. Here, the radio base station sends a further configuration request to the operation and maintenance server. This occurs over the second communication link to the core network. The configuration request can be a simple message mainly containing the identity of the radio base station (as previously received in the configuration message), and it can optionally contain more details. The operation and maintenance server thus receives enough information to determine the identity of the radio base station to thereby obtain the correct configuration and/or software for the radio base station. In the case of the first communication link being a broadcast link, the operation and management server can, after the receipt of the further configuration request, send a message to stop the configuration message from being continued to be transmitted over the broadcast medium. This performs a type of garbage collection of old configurations which is useful since the broadcast medium is limited and should not be crowded with obsolete configurations for radio base station deployments.

In an optional 58 receive further configuration step 58, the further configuration is received from the operation and maintenance server 31. This further configuration can include configuration parameters and software which is installed on the radio base station to ensure the radio base station has the appropriate software for communication with the rest of the mobile communication network.

In an optional activate cell(s) step 59, the radio base station activates the one or more cells that the radio base station is responsible for. After this step, the radio base station is in a fully operational state. It is to be noted that this whole method can all occur without any user involvement at the time of installation. In other words, the service technician can connect and power on the radio base station, after which it will assume a fully operational state without any user action at the site of installation.

Figure 4A:
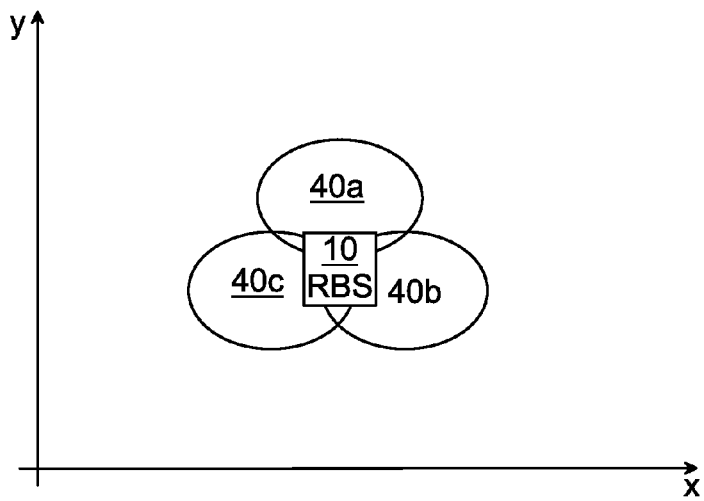
FIGS. 4A-C are schematic diagrams illustrating positions of radio base station of FIGS. 1A-B and 2 in various examples.
Figure 4B:
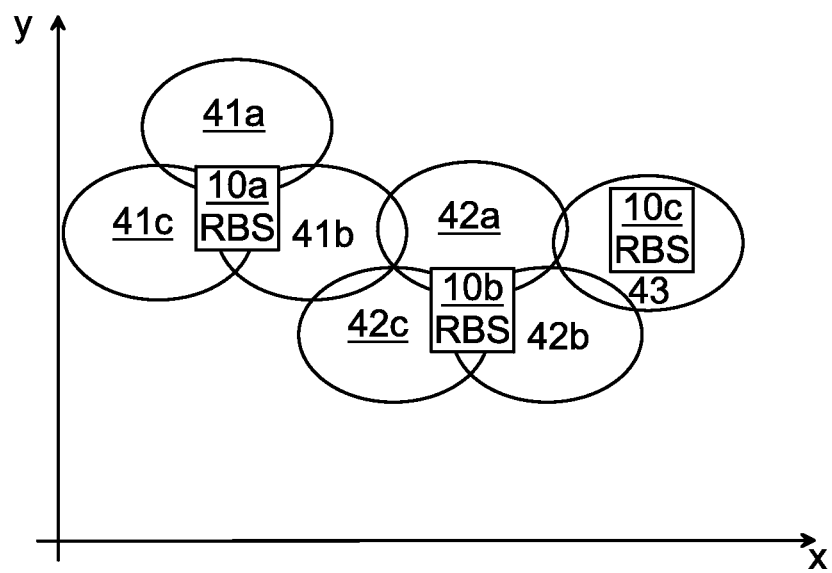
Figure 4C:
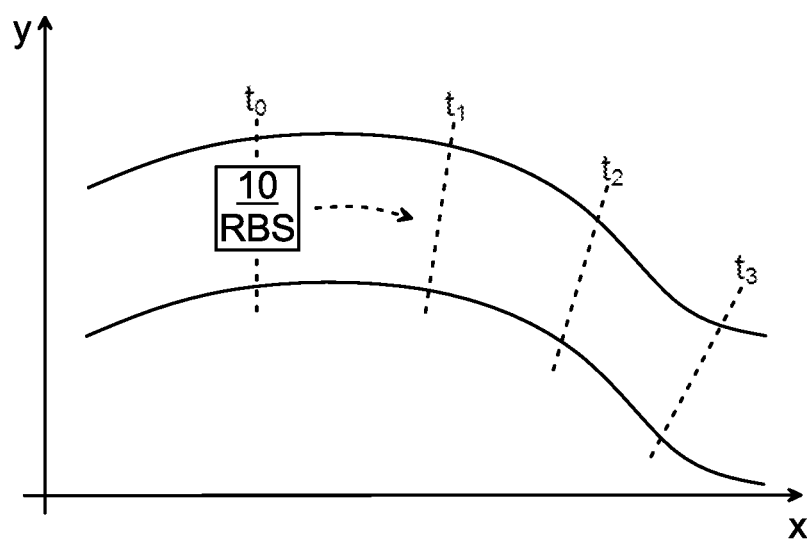

FIGS. 4A-C are schematic diagrams illustrating positions of radio base station of FIGS. 1A-B, 2 in various examples. The diagrams can more or less be considered to be different cell plans in an x-y coordinate system, which could in practice be longitude and latitude, respectively.

In FIG. 4A, the radio base station 10 is at a particular position in the x-y coordinate system. The radio base station 10 controls three cells 40a-c. Hence, if the configuration server receives location data for the radio base station being in the vicinity of the cells 40a-c, the identity of the radio base station is evident, since there are no other radio base stations that are present in the vicinity.

In FIG. 4B, there are three radio base stations 10a-c. A first radio base station 10a controls three cells 41a-c, a second radio base station 10b controls three cells 42a-c and a third radio base station 10c controls one cell 43. Since there is an overlap between cells of neighbouring radio base stations, it is not sufficient to take any position within the responsibility of a radio base station and use that to determine its identity. However, if the location of the radio base station is used, it makes the various radio base stations 10a-c distinguishable from each other. Alternatively, an average of positions of the cells (if remote radio units are used) can be used to distinguish radio base stations 10a-c from each other. In general, an RBS installation is a well planned and coordinated activity—hence the location of each RBS cell, the RBS and how they are located in relation to each other itself has been planned in advance and thus it is normally known when entering the position into the configuration Server how the RBS will measure its location.

In FIG. 4C, a mobile radio base station 10 is shown. The radio base station 10 moves along a track and is expected to be in various positions at various times $t_0$-$t_3$ as shown by the dashed lines. The configuration server can thus at a particular time see if the radio base station 10 matches an expected location to thereby derive its identity. This may be of use for mobile radio base stations, where the location of the radio base station 10 varies over time. Note that the radio base station 10 does not need to be in motion all the time; for example, the radio base station 10 can be located at a festival in a certain time interval. Alternatively, the radio base station can be located on a ship or a train, at which point the configuration server can optionally use third party information sources (such as a cruise operator or train operator) to determine expected positions for the radio base station at certain points in time.

Figure 5:
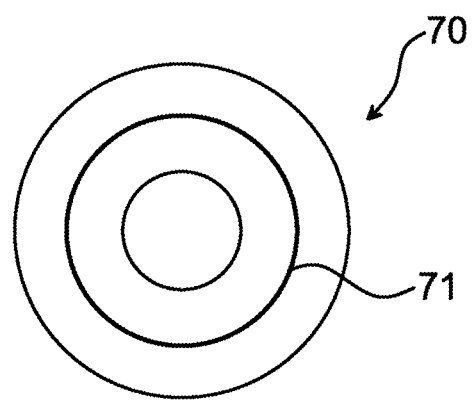
FIG. 5 schematically shows one example of a computer program product comprising computer readable means.

FIG. 5 schematically shows one example of a computer program product 70 comprising computer readable means 71. On this computer readable means 71, a computer program can be stored, which computer program, when run on the processor of the radio base station, can cause a radio base station to execute the method according to embodiments described herein. In this example, the computer program product is an optical disc, such as a CD (compact disc), a DVD (digital versatile disc) or a blu-ray disc. The computer readable means can also be solid state memory, such as flash memory or a software package distributed over a network, such as the Internet.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for initialising a radio base station, the method comprising the steps, performed in the radio base station, of:
obtaining location data for the radio base station;
receiving a configuration message over a first communication link, the configuration message matching the location data for the radio base station for identifying the radio base station as an intended recipient, the configuration message comprising at least one connectivity parameter; and
establishing, based on the at least one connectivity parameter, a connection with a core network over a second communication link, the second communication link being different from the first communication link.

2. The method according to claim 1, wherein the step of receiving the configuration message comprises receiving the configuration message from a configuration server and the method further comprises the step, prior to the step of receiving a configuration message, of:
sending, over the first communication link, a configuration request to the configuration server, the configuration request comprising the location data for the radio base station.

3. The method according to claim 2, further comprising the step, prior to the step of sending a configuration request, of:
initialising communication over the first link using a subscription entity enabling international roaming access.

4. The method according to claim 2, wherein the further configuration message comprises one or more of the following parameters: frequencies and transmission power levels.

5. The method according to claim 2, further comprising the step of:
activating any cells under the control of the radio base station.

6. The method according to claim 1, wherein the first communication link is a bidirectional link comprising use of at least one of: a mobile communication data link via another radio base station, or a satellite telephony link.

7. The method according to claim 1, further comprising the step, after the step of establishing a connection with the core network, of:

receiving a further configuration message comprising all additional configuration data required to enable normal operation of the radio base station.

8. The method according to claim 7, wherein the at least one connectivity parameter comprises an identifier of the radio base station, and wherein the method further comprises the step, after the step of establishing a connection with the core network and prior to the step of receiving a further configuration message, of:

sending a further configuration request comprising the identifier of the radio base station, to an operation and management server to allow the operation and management server to obtain the all additional configuration data required to enable normal operation of the radio base station.

9. The method according to claim 1, wherein the at least one connectivity parameter comprises at least one of: a network address for the radio base station for the second communication link, an identifier of a core network interface of the radio base station to use for the second communication link, and a network address for an operation and management server to communicate with over the second communication link.

10. The method according to claim 1, wherein the step of receiving a configuration message comprises receiving the configuration message, comprising intended location data, over the first communication link being a broadcast medium, and verifying that the radio base station is an intended recipient by matching the intended location data and the location data of the radio base station.

11. A radio base station comprising:

a location obtainer arranged to obtain location data for the radio base station;

a first link interface arranged to receive a configuration message over a first communication link, the configuration message matching the location data for the radio base station for identifying the radio base station as an intended recipient, and the configuration message comprising at least one connectivity parameter;

a core network interface; and a controller arranged to establish, based on the at least one connectivity parameter, a connection with a core network over a second communication link through the core network interface, the second communication link being different from the first communication link.

12. The radio base station according to claim 11, wherein the location obtainer comprises a receiver for a use with any one or more of Global Positioning System, GPS; Global Orbiting Navigation Satellite System, GLONASS; Galileo; Compass/Beidou; and Indian Regional Navigational Satellite System, IRNSS.

13. The radio base station according to claim 11, wherein the location obtainer is arranged to obtain location data of remote radio units under control of the radio base station.

14. The radio base station according to claim 11, wherein the location obtainer is arranged to obtain location data based on a detected radio environment of radio units connected to the radio base station.

15. The radio base station according to claim 11, wherein the core network interface is an interface for an optical connection, a galvanic connection or a microwave link.

16. A non-transitory computer program product embodied with a computer-executable computer program for initialising a radio base station, the computer program comprising computer program code which, when run on a processor of a radio base station, causes the radio base station to:

obtain location data for the radio base station;

receive a configuration message over a first communication link, the configuration message matching the location data for the radio base station for identifying the radio base station as an intended recipient, and the configuration message comprising at least one connectivity parameter; and establish, based on the at least one connectivity parameter, a connection with a core network over a second communication link, the second communication link being different from the first communication link.

17. The non-transitory computer program product according to claim 16 comprising a computer readable means on which the computer program is stored.

* * * * *